(12) United States Patent
Van Der Upwich (10) Patent No.: US 11,898,648 B2
(45) Date of Patent: Feb. 13, 2024

(54) PRESSURE VALVE FOR A LIQUID (71) Applicants: HaGePe International B.V., Huizen (NL); Cenergist Limited, Washington (GB)

(72) Inventor: Stijn Van Der Upwich, Enkhuizen (NL)

(73) Assignees: Cenergist Limited, Washington (GB); HaGePe International B.V., Huizen (NL)

( * ) Notice: Subject to any disclaimer, the term of this patent is extended or adjusted under 35 U.S.C. 154(b) by 0 days.

(21) Appl. No.: 17/625,942

(22) PCT Filed: Jul. 10, 2020

(86) PCT No.: PCT/NL2020/050457
§ 371 (c)(1),
(2) Date: Jan. 10, 2022

(87) PCT Pub. No.: WO2021/010827
PCT Pub. Date: Jan. 21, 2021

(65) Prior Publication Data
US 2022/0243834 A1    Aug. 4, 2022

(30) Foreign Application Priority Data
Jul. 12, 2019 (NL) ...................... 2023492

(51) Int. Cl.
*F16K 17/28* (2006.01)
*G05D 16/10* (2006.01)
*F16K 17/30* (2006.01)

(52) U.S. Cl.
CPC ............ *F16K 17/28* (2013.01); *G05D 16/103* (2013.01); *F16K 17/30* (2013.01); *Y10T 137/7869* (2015.04)

(58) Field of Classification Search
CPC ............... F16K 25/02; Y10T 137/7869; Y10T 137/7873
See application file for complete search history.

(56) References Cited

U.S. PATENT DOCUMENTS

| 530,442 | A | * | 12/1894 | Munger | .................. | F16K 17/30 |
| | | | | | | 137/854 |
| 541,714 | A | * | 6/1895 | Bottomly et al. | ...... | F16K 24/06 |
| | | | | | | 137/526 |
| 920,716 | A | * | 5/1909 | Beckman | ................ | F16K 47/10 |
| | | | | | | 137/513.3 |

(Continued)

FOREIGN PATENT DOCUMENTS

| DE | 1450640 | 5/1969 |
| EP | 1131687 | 9/2001 |

(Continued)

*Primary Examiner* — Robert K Arundale
(74) *Attorney, Agent, or Firm* — Marcus C. Dawes (57) ABSTRACT

Pressure valve for a liquid comprising a housing with an inlet and an outlet for directing the liquid from the inlet through the housing to the outlet along a flow direction, wherein valve further comprises movable member which is movable in the housing towards and away from the outlet between a blocked position wherein the movable member blocks the outlet and an unblocked position wherein the movable member is moved away from the outlet in a direction opposite the flow direction.

19 Claims, 4 Drawing Sheets

(56) References Cited

U.S. PATENT DOCUMENTS

| | | | | |
|---|---|---|---|---|
| 1,096,431 | A * | 5/1914 | Kepple | F16K 17/30 |
| | | | | 116/DIG. 42 |
| 2,497,906 | A * | 2/1950 | Peters | F16K 15/144 |
| | | | | 137/859 |
| 2,676,782 | A * | 4/1954 | Bostock | F16K 1/46 |
| | | | | 137/539.5 |
| 3,116,752 | A * | 1/1964 | Duncan | B60T 11/18 |
| | | | | 137/530 |
| 3,285,274 | A | 11/1966 | Bouvier | |
| 3,584,274 | A | 6/1971 | Dimitrios | |
| 4,010,770 | A | 3/1977 | Peters | |
| 4,030,520 | A | 6/1977 | Sands | |
| 5,983,928 | A | 11/1999 | Hsiao | |
| 2011/0147016 | A1* | 6/2011 | Blease | A62C 35/68 |
| | | | | 137/517 |
| 2015/0122340 | A1* | 5/2015 | Edelmayer | F02N 19/00 |
| | | | | 137/154 |
| 2022/0243834 | A1 | 8/2022 | Van Der Upwich | |

FOREIGN PATENT DOCUMENTS

| | | |
|---|---|---|
| EP | 3051117 | 8/2016 |
| NL | 1010592 | 8/1998 |
| WO | 2015069114 | 5/2015 |
| WO | 2021010827 | 1/2021 |

\* cited by examiner

PRESSURE VALVE FOR A LIQUID

The present invention relates to a pressure valve for a liquid. The invention further relates to a device for limiting or keeping constant a flowing quantity of liquid. The invention further relates to manufacturing such devices.

Pressure valves comprising a housing with an inlet and an outlet and a movable member for closing the inlet as such are known in the form of for instance a relief valve or pressure relief valve. If a predetermined pressure level is reached, a spring mounted movable member moves away from the inlet, thereby allowing a fluid, gas or liquid, to flow through the housing to the outlet. These type of pressure relief valves open when a predetermined pressure is reached.

It is a goal of the present invention, next to other goals, to provide an improved, efficient and/or easily adaptable pressure valve for a liquid.

This goal, amongst other goals, is met by a pressure valve for a liquid according to appended claim 1. More specifically, this goal, amongst other goals, is met by a pressure valve for a fluid, in particular a liquid, comprising a housing with an inlet and an outlet for directing the liquid from the inlet through the housing to the outlet along a flow direction, wherein valve further comprises a movable member which is movable in the housing towards and away from the outlet between a blocked position wherein the movable member blocks the outlet and an unblocked position wherein the movable member is away from the outlet in a direction opposite the flow direction. The moveable member will be movable under the influence of the liquid flow through the housing and will urge the movable member towards the outlet. A relative high pressure at the inlet, with respect to the outlet, will thus move the movable member to the blocked position. In the blocked position, liquid passage through the outlet and thus the valve is blocked, such that little, or substantially no liquid will flow from the inlet to the outlet. The valve is thus arranged such that the movable member is in the unblocked position at a first (dynamic) inlet pressure and is moved towards the blocked position at a second inlet pressure being higher than the first pressure. Preferably, the movable member is arranged to move to the blocked positon upon increasing pressure at the inlet. A valve is thus provided which closes liquid flow with increasing dynamic inlet pressure.

An efficient and reliable valve is obtained if the inlet and the outlet are substantially aligned. In use, the liquid can then flow efficiently from the inlet to the outlet along the flow direction. It is then preferred that the movable member is only substantially movable along this flow direction.

The valve may hereto comprise a guide for guiding the movable member for limiting movement along the flow direction. The central axes of the inlet, the outlet and the moving direction of the movable member are preferably parallel, more preferably coincide. The position of the movable member is then efficiently regulated by the flow of liquid through the housing. A compact composition, which allows an efficient and controllable blocking at (predefined) higher pressures, is obtained if the movable member is movable between the inlet and the outlet.

The movable member is movable under the influence of the ratio of the pressures at the inlet side and the outlet side of the movable member. The movable member will move to the outlet of the housing when the pressure is higher at the inlet side of the movable member and vice versa. In case the pressures are substantially equal, an equilibrium is reached and the movable member may remain substantially stationary in the housing.

The outlet side of the movable member is defined as that part of the movable member which faces or is directed towards the outlet. The inlet side is then preferably located at the other side, for instance as seen with respect to the flow direction.

To be able to adjust the pressure at which the outlet will be blocked, the pressure valve preferably comprises at least one flow passage for directing liquid to the outlet side of the movable member, preferably from the inlet side to the outlet side. The size and/or number of flow passages thus determines a flow of liquid from preferably the inlet side to the outlet side of the movable member. The pressure at the outlet side of the movable member can thus be increased. A higher inlet pressure is thus required to move the movable member to the blocked position. Preferably, the at least one flow passage is arranged to direct a flow of liquid to the outlet side of the movable member separate from the movable member. The flow of liquid through the at least one flow passage does not typically influence the movement of the movable member.

It is further preferred if the at least one flow passage has an outlet directed in a direction with a component opposite the flow direction. In use, this will urge the movable member in a direction opposite the flow direction, i.e. away from the outlet towards the unblocked positon. It is preferred if the outlet of the flow passage is directed towards the movable member. A flow of liquid from the outlet will then be directed towards the outlet side of the movable member, thereby urging the movable member towards the unblocked position. Preferably, the outlet is directed towards the movable member in a direction having an angle of larger than 110°, more preferably larger than 135°, with respect to the flow direction.

Movement of the movable member can efficiently be influenced by the flow passage if an outlet of a flow passage is arranged adjacent the outlet, in particular when the outlet is directed towards the movable member in a direction with a component opposite the flow direction as mentioned above. Preferably, the movable member is arranged to block the flow passage outlet in the blocked position. The movable member then blocks both the outlet of the valve and the flow passage outlet, thus reducing, or even stopping, internal liquid flow in the valve in the blocked position.

To achieve a balanced movement of the movable member along the flow direction, it is preferred if the one or more flow passages are arranged to direct liquid to the movable member from a plurality of positions located coaxially around an axis of the flow direction, more preferably from a plurality of positions around the outlet. It is possible to provide a slit like flow passage outlet surrounding the outlet and/or a plurality of outlets for instance. A corresponding number of flow passages, may be provided.

To effectively direct liquid from the inlet side to outlet side of the movable member, it is preferred if the outlet comprises a tubular member protruding into the housing, wherein one end surface of the tubular member is arranged to receive the movable member in the blocked position. The end surface for receiving the movable member then extends inwardly with respect to the housing, for instance a bottom thereof. A flow passage can efficiently be arranged for directing liquid to the outlet side of the movable member. Preferably, the flow passage is arranged to direct liquid to a location at or near said end surface of the tubular member.

It is hereby preferred if the opening of the flow passage outlet extends in the end surface of the tubular member. The flow passage may then at least partially extend through the wall of the tubular member. The liquid is then efficiently directed at the location of the outlet side of the movable member. Preferably, the end surface of the tubular member comprises a plurality of outlets distributed around said surface such that the outlet is surrounded by the outlets as described above.

A reliable valve member is obtained if the movable member is at least substantially spherical. It is then preferred if the outlet is shaped to receive the movable member and may be formed complementary to the movable member. In the embodiment of the spherical movable member, the outlet may have a concave shape to receive the spherical movable member.

The at least substantially spherical moveable member may be held using a suitable holding member. In use this member may for instance guide the spherical member such that the movable member is only movable along the flow direction. The valve may thus further comprise a ring shaped holder for holding the spherical movable member, wherein the ring shaped holder and the spherical movable member may be formed integrally or separately.

Additionally or alternatively, the holding member may help to direct the flow from the inlet side to the outlet side of movable member. The ring shaped member may thereto be provided with at least one recess in the circumferential surface for fluid passage.

To ensure a liquid flow through the outlet at lower pressures, the movable member is biased to the unblocked position. This may be achieved by the flow passages which direct liquid from the inlet side to the outlet side, thereby biasing the movable member away from the outlet. Additionally or alternatively a spring may be arranged for urging the movable member towards the unblocked position. A spring may be arranged between the movable member and the housing, for instance at the location of the outlet, for urging the movable member away from the outlet. In the case of a spherical moveable member provided with a ring shaped holder, it is preferred if the spring engages the ring shaped holder.

To further direct the flow of liquid in the housing, the valve preferably further comprises a dividing wall extending at least partially between the inlet and the outlet. The dividing wall may for instance divide the housing in two compartments, one containing the outlet and the associated movable member and one separated therefrom. For efficiently directing the liquid flow, the dividing wall is preferably provided with one or more flow passages. An efficient direction of the liquid flow is obtained if the flow passage in the dividing wall comprises a slot which is preferably open to the inlet side of the dividing wall.

Preferably, the dividing wall at least partially surrounds the outlet and the movable member associated therewith. The flow of fluid to the outlet and to the movable member can then be controlled by shaping the dividing wall and/or the flow passages thereof. Preferably, the dividing wall extends from the housing wall comprising the outlet, wherein the dividing wall is a tubular member extending around the outlet and the movable member. More preferably, the dividing wall is a cylindrical member arranged coaxially around the outlet and the movable member. The dividing wall preferably also extends coaxially around any tubular member forming the outlet as mentioned above.

It is further preferred when the tubular or cylindrical member limits movement of the movable member only along the flow direction, the dividing wall can then function as guide for the movable member, for instance in cooperation with the ring shaped holder as described above.

To prevent clogging of the pressure valve, it is preferred if the pressure valve further comprises a sieve at the inlet. To prevent clogging in the valve, the size or diameter of a flow passage in the valve is larger than the largest pore size of the sieve. Any particles entering the valve through the sieve can then flow through the valve.

The pressure valve is particularly suitable in the context of flow limiters. In order to save water, in particular clean drinking water, it is known to include flow regulating devices, also referred to as flow limiters, in water piping systems, to reduce water usage, for instance when taking a shower or bath. Such a flow limiter for limiting the flow of a fluid flowing there through for instance comprises a housing provided with an inlet, an outlet and a resilient plate-like valve element which is arranged in the housing and which is movable to and from a valve seat, defining a flow opening there between. Such a valve element is movable under the influence of a pressure of the fluid flowing there through and which is arranged to adjust the size of the through flow opening. Higher pressures will urge the valve element to the valve seat, thereby reducing the through flow opening. The flow through the outlet is then substantially constant over a pressure range at the inlet. Such flow limiters are described in EP 1.131.687 A and the Netherlands patent application no. 1010592, the contents of which are hereby incorporated by reference. These flow regulators/limiters are typically inserted in taps or shower heads or piping associated therewith to keep the flow of water substantially constant regardless of the (dynamic) water pressure.

In order to limit and/or keep constant the flow of liquid on a larger scale, for instance in hotels, cruise ships, agriculture and in (the petrochemical) industry, it is known to provide a device for limiting or regulating a quantity of fluid flowing there through, comprising a housing which comprises a front chamber and a rear chamber; a partition arranged in the housing and provided with two or more openings; and a flow limiter arranged in at least one or both openings. Such a device is described in WO 2015/069114, the contents of which are hereby incorporated by reference. By changing the number and/or types of flow limiters in the housing of the device, the flow of water through the device can be accurately adjusted to the specific need.

These flow limiters are specifically designed to reduce, i.e. keep constant, the flow of liquid at a specific pressure range. Typically, these limiters are capable of keeping the flow constant even at higher pressures. At lower pressures however, the flow may not be as steady as required or the resistance may be too high such that the flow is too small.

Therefore, according to a further aspect of the invention, a device for limiting or keeping at least substantially constant a flowing quantity of liquid is provided, comprising a flow limiter and a pressure valve as described above in parallel to the flow limiter. The flow limiter is preferably arranged to operate, i.e. keep the flow constant, from a predetermined pressure and higher, while the pressure valve is then arranged to pass through liquid up to the predetermined pressure. The valve, for instance the movable member as described above, is movable between an unblocked position at a first inlet pressure and is moved towards a blocked position at a second inlet pressure being higher than the first pressure. Preferably, the flow limiter is then arranged to pass through liquid at a substantially constant rate at this second pressure and higher. Thus, at lower pressures of liquid flow through the pressure valve, while at higher pressures the liquid flows through the flow limiter, while substantially no liquid flows through to the pressure valve. A flow limiting device which is able to provide a constant flow rate, also at lower pressures, is thus provided.

This is in particular relevant when the backpressure at the outlet of the flow limiting device is relatively high, for instance in the case of a sprinkler system, for instance as used for the irrigation of crops. In this application, and in particular in combination with lower inlet pressure, a combination of a flow limiter and a pressure valve arranged to pass through liquid only at lower pressures, leads to an efficient flow limiting device.

The invention further relates to a method for manufacturing a pressure valve according to the invention, comprising the steps of:
a. defining a closing pressure for the pressure valve;
b. designing the flow passages in the pressure valve such that the movable member moves to the blocked position when the pressure at the inlet reaches the closing pressure, and;
c. manufacturing said pressure valve.

As mentioned above, by adapting the number and/or sizes of the flow passages, the shape and/or size of the movable member, the ring shaped holder thereof, or any flow passages in the dividing wall, the pressure at which the pressure valve will close can be defined efficiently.

The present invention is further illustrated by the following Figures, which show a preferred embodiment of the pressure valve according to the invention, and are not intended to limit the scope of the invention in any way, wherein:

FIG. 1 shows a device 100 for limiting or regulating a quantity of fluid flowing there through, comprising a housing 100a which comprises a front chamber 103 and a rear chamber 104; a partition 105 arranged in the housing 100a and provided with two or more openings 105a; and a flow limiter 200 arranged in one or both openings. Such a device is described in WO 2015/069114.

Figure 1:
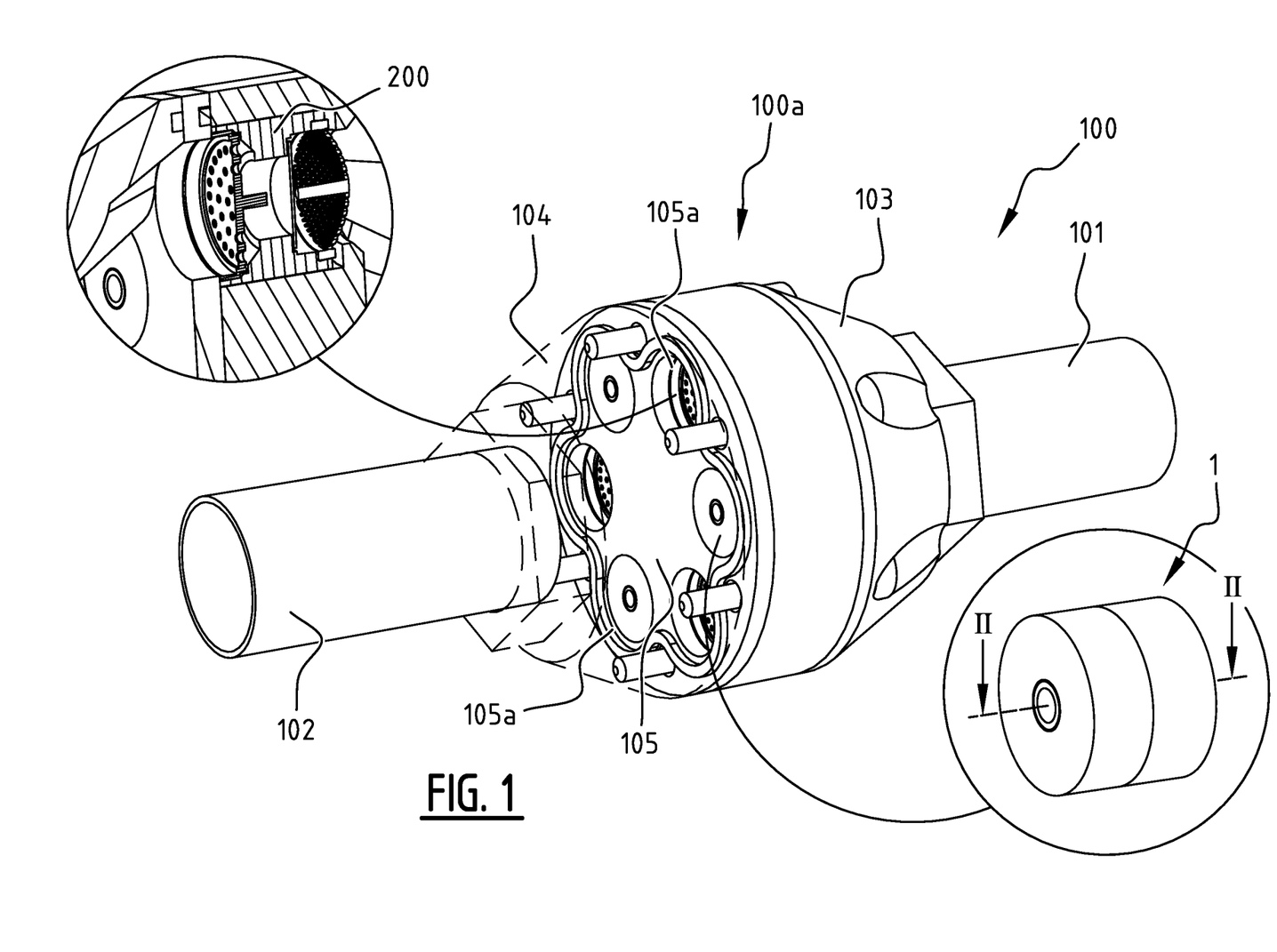
FIG. 1 schematically shows a flow limiting device.
Figure 2:
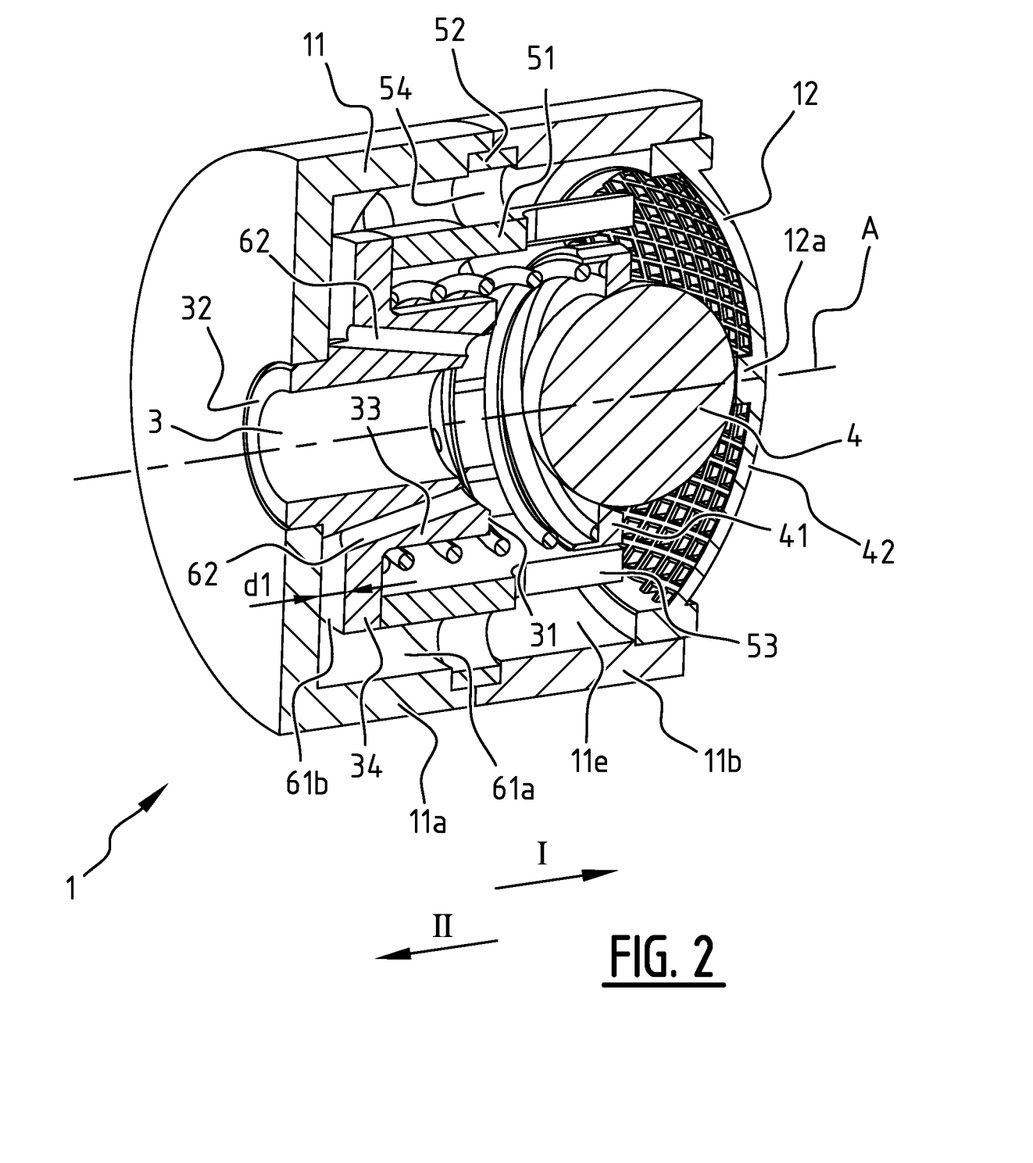
FIG. 2 shows a pressure valve in perspective cross-section.
Figure 3:
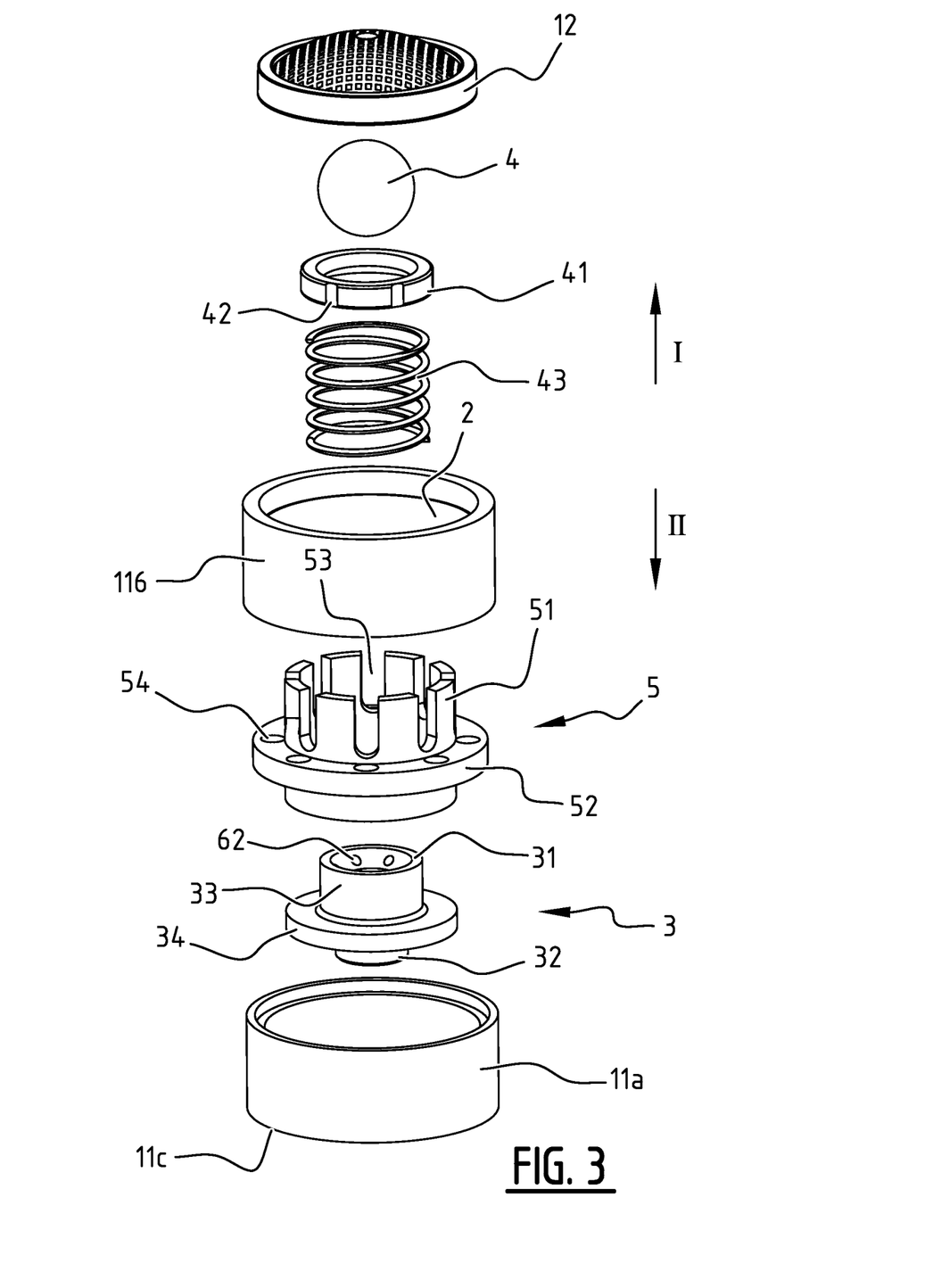
FIG. 3 shows the pressure valve in exploded view.

An inlet pipe 101 debouches in the front chamber 103 and an outlet pipe 102 is connected to the rear chamber 104. In this example, three flow limiters 200 as described in EP 1.131.687 A and the Netherlands patent application no. 1010592 are provided in three of the openings 105a of the partition 105. The flow limiters 200 are arranged and capable of providing a constant flow of liquid at their exit side, substantially regardless of the input pressure at the inlet pipe 101, provided that this pressure is sufficiently high, for instance at least approximately 2 bar in this example. In order to provide a suitable flow also at lower pressures, pressure valves 1 are arranged in the other openings 105a. Pressure valves 1 are arranged to open at lower pressures, and thus pass through liquid, and to close at a higher pressure, in this example again at approximately 2 bar. Also at lower pressures, a substantial constant flow of liquid is thus guaranteed. A cross-section of the pressure valve is shown in FIG. 2 and an exploded view is shown in FIG. 3.

The pressure valve 1 comprises a housing 11 with an inlet 2 and a outlet 3, in this example located opposite the inlet 2 and aligned along axis A, which corresponds in this example to the flow direction through the pressure valve 1. The housing 11 comprises a bottom 11c, in which the outlet 3 opens. In this example, the housing comprises two parts 11a 11b. The upper part 11b is cylindrical and the lower part 11c is provided with the bottom 11c. At the inlet 2, a sieve 12 is provided to prevent the inflow of larger particles.

The outlet 3 comprises a tubular member 33 of which one end 32 is arranged in the bottom surface 11c of the valve housing 11. The other end 31 of the tubular member 31 has a convex shape as will be explained later for receiving a ball 4 as movable member. Flow passages 62 end in this end 31 of the tubular member 33. The tubular member 33 is further provided with a flange 34, which in assembled state extends at a distance d1 above the bottom 11d of the interior 11e of the housing 11.

A dividing member 5 having a dividing wall 51 is also arranged in the interior 11e of the housing 11. The dividing wall 51 divides the housing 11 in a circumferential outer part, between the dividing wall 51 and the walls 11a,b, and an inner part, enclosed by the said dividing wall 51. The outlet 3, in particular the upper end 31 thereof, extends in this inner part. Provided in the dividing wall 51 are slots 53 which form flow passages for allowing liquid to flow from the inlet 2 to the outer part and vice versa. By adapting the shape and number of these slots 52, this flow can be adjusted.

The dividing member 5 further comprises a flange 52 in this example, which is provided with a plurality of openings 54 which again form flow passages for liquid. The shape and number of these openings 54 defines the amount of liquid which is allowed to flow to the lower part near the bottom 11d of the housing 11. In this example, the lower part of the dividing wall 51 engages the flange 34 of the outlet 3. A passage 61a is thus formed between housing wall 11a and dividing wall 51, respectively flange 34. This passage 61a debouches in lower passage 61b defined between flange 34 and bottom 11d of the housing 11. Flow passages 62, which will be explained in greater detail below, are connected to lower passage 61b.

For closing the outlet 3, in particular the upper part 31 thereof, a movable member 4 in the form of a ball is provided. The ball 4 is held in a correspondingly shaped ring 41 which at its circumferential surface is provided with recesses 42 which again form flow passages. A spring 43 is arranged between ball 4, in particular the ring 41, and the housing 11, in this example the flange 34 of the outlet 3. The spring 43 urges the ball 4 towards the inlet 2, which direction is indicated with the arrow I. The sieve 12 is thereto provided with a receptacle 12a for receiving the ball 4 (see in particular FIG. 2).

The ball 4 and the ring 41 are in this example received within the dividing wall 51 and the ring 41 and dividing wall 51 cooperate such that the ball 4 is only movable along one axis A, in this example the same axis A along which the inlet 2 and outlet 3 are aligned and which corresponds to the main flow direction. Recesses 42 in the ring 41, together with slots 53 define the flow of liquid towards and from the space within the dividing wall 51.

Figure 4A:
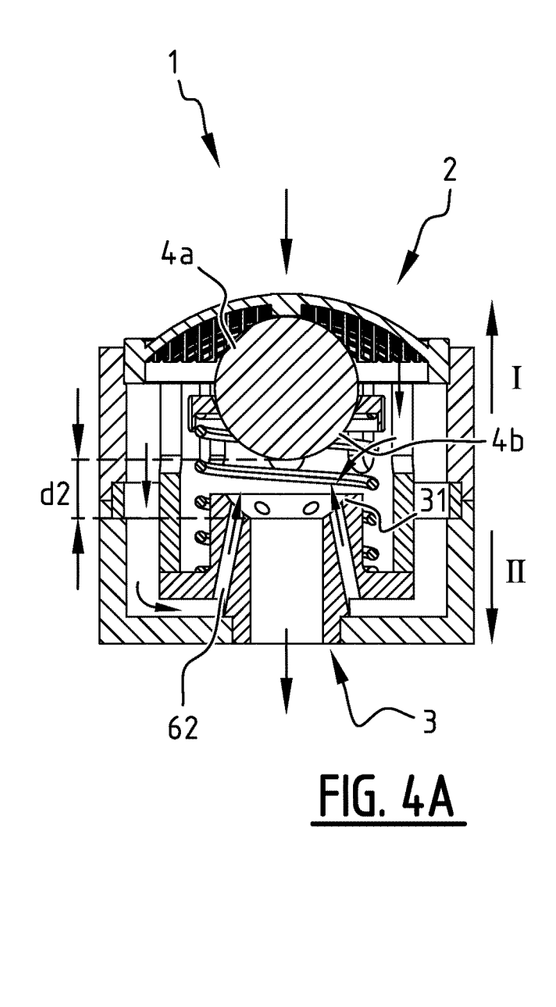
FIGS. 4a-c show the pressure valve in cross-section in different working positions
Figure 4B:
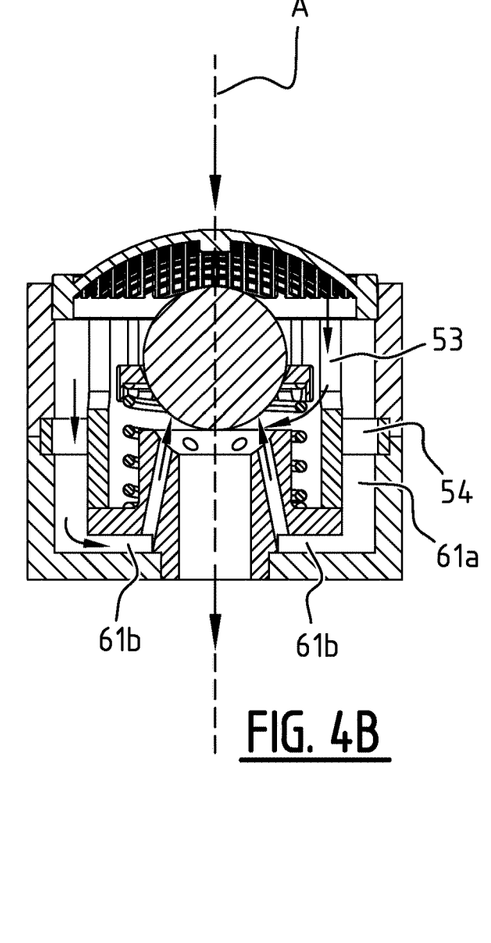
Figure 4C:
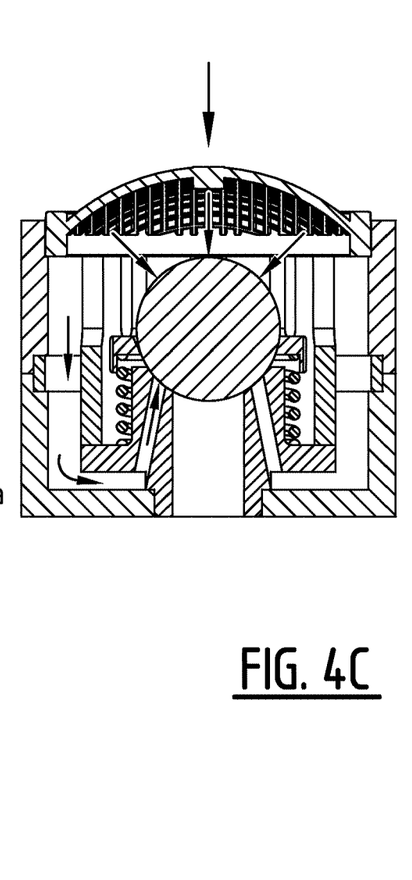

The working of the pressure valve 1 will be further explained with reference to FIG. 4a-c. In the position as shown in FIG. 4a, the ball 4 extends at a distance d2 from the outlet 3, in particular the upper end 31 thereof. Liquid is thus allowed to flow from the inlet 2, through the housing 11 to the outlet 3. The main flow direction is indicated in FIG. 4b with the dashed line A. Liquid flows in the direction indicated with arrow II.

If the pressure at the inlet 2 increases, and thus the pressure at the inlet side 4a of the ball 4, the ball 4 will be urged towards the outlet 3 in the direction of the flow direction A, indicated with arrow II. It will be appreciated that the ball 4 is only movable along the axis A and that movement in another direction is substantially limited. If the pressure at the inlet side 4a is sufficiently high, the ball 4 is moved completely to the outlet 3, closing or blocking said outlet 3. This is shown in FIG. 4c. The movable member in the form of the ball 4 is now in the blocked position wherein liquid flow through the outlet is blocked. The upper end 31 of the outlet 3 is thereto shaped complementary to the ball 4 to allow effective blockage of the outlet 3.

When the pressure again decreases, the ball 4 may move in a direction opposite the main flow direction A away from the outlet 3, indicated with the arrow I, see FIG. 4b. Some liquid may now flow through the outlet 3. Thus, the higher the inlet pressure, the less liquid flows through the valve 1. In order to adjust the pressure at which the valve 1 closes, flow passages, for instance those indicated with 42, 53, 54 and specifically 62, are provided to direct liquid to the outlet side 4b of the ball 4. The outlet side 4b is the side of the ball 4 oriented towards the outlet 3.

The flow passages 62 are arranged to direct a flow of liquid from the inlet 2, or the inlet side 4a of the ball 4, towards the outlet side 4b in a direction with a component opposite the main flow direction. The openings in the upper part 31 are thus oriented upwards, such that the flow is also substantially upwardly oriented. This is indicated with the arrows. These flows will urge the ball member 4 in the direction indicated with I and will thus counter any movement in the direction II. By adjusting the amount of liquid flowing through the passages 62, the closing pressure of the valve 1 can be controlled.

The flow passages 62 are arranged in the tubular part 33 of the outlet 3 and are interconnected with the passage 61b defined between the flange 34 and the bottom 11d of housing 11. This passage 61b connects to the passage 61a defined between the dividing wall 51 and the housing wall, in this example the lower housing part 11a. The passage 61a is delimited in this example by flange 52, in which openings 54 are defined. The shape and number of openings 54 thus also influences the amount of liquid flowing through the passages 62. The amount of liquid flowing from the central space within the dividing wall 51 to the circumferential outer part is inter alia defined by the number and shape of the slots 53 in the dividing wall 51. Also the recesses 42 influence this flow. Thus, by adjusting the flow passages in the pressure valve 1, the closing pressure of the valve can be adjusted efficiently.

The present invention is not limited to the embodiment shown, but extends also to other embodiments falling within the scope of the appended claims. It is for instance noted that it is possible that the pressure valve is not provided with any spring member, as the flow passages may be responsible for the urging back of the movable member. The pressure valve, or generally valve, may further be used as a fluid valve, for instance for gases.

The invention claimed is:

1. A pressure valve for a liquid comprising a housing with an inlet and an outlet, wherein the pressure valve is arranged for directing the liquid from the inlet through the housing to the outlet along a flow direction, wherein the valve further comprises a movable member which is movable in the housing towards and away from the outlet between a blocked position wherein the movable member blocks the outlet and an unblocked position wherein the movable member is away from the outlet in a direction opposite the flow direction, wherein the movable member is biased to the unblocked position, wherein the pressure valve comprises at least one flow passage for directing liquid from an inlet side to an outlet side of the movable member, and wherein the at least one flow passage has at least one outlet comprising a directional component opposite the flow direction and directed towards the movable member.

2. The pressure valve according to claim 1, wherein the inlet and the outlet of the housing are substantially aligned along the flow direction, wherein the movable member is only substantially movable along the flow direction.

3. The pressure valve according to claim 2, wherein the movable member is movable between the inlet and the outlet of the housing.

4. The pressure valve according to claim 1, wherein the movable member is arranged to move to the blocked position upon increasing pressure at the inlet.

5. The pressure valve according to claim 1, wherein at least one outlet of the at least one flow passage is arranged adjacent the outlet of the housing.

6. The pressure valve according to claim 5, wherein there are a plurality of flow passages having outlets arranged surrounding the outlet of the housing.

7. The pressure valve according to claim 1, wherein the outlet of the housing comprises a tubular member protruding into the housing, wherein one end surface of the tubular member is arranged to receive the movable member in the blocked position, wherein the at least one flow passage is arranged to direct liquid to a location at or near said end surface of the tubular member.

8. The pressure valve according to claim 7, wherein the outlet of the at least one flow passage extends into the end surface of the tubular member.

9. The pressure valve according to claim 1, wherein the movable member is at least substantially spherical.

10. The pressure valve according to claim 9, further comprising a ring shaped holder for holding the at least substantially spherical movable member, wherein the ring shaped member is provided with at least one recess in a circumferential surface for fluid passage.

11. The pressure valve according to claim 10, comprising a spring for urging the movable member towards the unblocked position.

12. The pressure valve according to claim 11, wherein the spring engages the ring shaped holder.

13. The pressure valve according to claim 1, further comprising a dividing wall extending at least partially between the inlet and the outlet of the housing, wherein the dividing wall is provided with the at least one flow passage.

14. The pressure valve according to claim 13, wherein the flow passages in the dividing wall comprise a slot which is open to an inlet side of the dividing wall.

15. The pressure valve according to claim 13, wherein the dividing wall is cylindrical and arranged coaxially around an outlet and the movable member.

16. The pressure valve according to 17, wherein the cylindrical member limits movement of the movable member along the flow direction.

17. The pressure valve according to claim 1, further comprising a sieve at the inlet, wherein the diameter of the at least one flow passage in the valve is larger than the largest pore size of the sieve.

18. A device for limiting or keeping constant a flowing quantity of liquid, comprising a flow limiter and a pressure valve according to claim 1 arranged in parallel to the flow limiter.

19. A method for manufacturing a pressure valve according to claim 1, comprising the steps of:
   a. defining a closing pressure for the pressure valve;

b. defining the flow passages in the pressure valve such that the movable member moves to the blocked position when the pressure at the inlet reaches the closing pressure; and;
c. manufacturing said pressure valve.

* * * * *